US008657691B2

(12) United States Patent
Watarai

(10) Patent No.: US 8,657,691 B2
(45) Date of Patent: Feb. 25, 2014

(54) TORSIONAL VIBRATION DAMPING APPARATUS

(75) Inventor: Shinichiro Watarai, Handa (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/499,185

(22) PCT Filed: Sep. 22, 2011

(86) PCT No.: PCT/JP2011/005335
§ 371 (c)(1),
(2), (4) Date: Mar. 29, 2012

(87) PCT Pub. No.: WO2013/042170
PCT Pub. Date: Mar. 28, 2013

(65) Prior Publication Data
US 2013/0079164 A1    Mar. 28, 2013

(51) Int. Cl.
*F16F 15/121* (2006.01)
(52) U.S. Cl.
USPC .......................................... 464/66.1; 464/109
(58) Field of Classification Search
USPC ................... 464/66.1, 68.1, 109, 160; 74/411
See application file for complete search history.

(56) References Cited

U.S. PATENT DOCUMENTS

| | | | |
|---|---|---|---|
| 1,672,400 A * | 6/1928 | West | 464/109 |
| 4,674,992 A | 6/1987 | Carmillet et al. | |
| 7,516,828 B2 | 4/2009 | Kitada | |
| 2006/0102444 A1 | 5/2006 | Kitada | |

FOREIGN PATENT DOCUMENTS

| | | |
|---|---|---|
| JP | 63-009727 A | 1/1988 |
| JP | 09-196122 A | 7/1997 |
| JP | 10-030647 A | 2/1998 |
| JP | 2006-144861 A | 6/2006 |
| JP | 2006-316963 A | 11/2006 |
| JP | 2010-164125 A | 7/2010 |

* cited by examiner

*Primary Examiner* — Gregory Binda
(74) *Attorney, Agent, or Firm* — Sughrue Mion, PLLC

(57) ABSTRACT

The torsion angle between a first rotation member and a second rotation member can be increased to lower the rigidity of a resilient member, thereby enhancing the attenuation property of torsional vibration. The torsional vibration damping apparatus 1 comprises a pair of disc plates 4, 5 having the rotation torque from an internal combustion engine transmitted thereto, input gears 9, 10 rotatably supported on the disc plates 4, 5, an output gear 13 provided to be relatively rotatable with respect to the disc plates 4, 5 and held in mesh with the input gears 9, 10, a boss member 7 splined to an input shaft 8 of a power transmission train, and a coil spring 14 having one end portion fastened to the input gear 9 and the other end portion fastened to the input gear 10. The input gear 9 has a crank member 15 radially spaced apart from a gear pin 11 of the input gear 9 to support one end portion of the coil spring 14, while the input gear 10 has a crank member 16 radially spaced apart from a gear pin 12 of the input gear 10 to support the other end portion of the coil spring 14.

3 Claims, 8 Drawing Sheets

TORSIONAL VIBRATION DAMPING APPARATUS

CROSS REFERENCE TO RELATED APPLICATIONS

This application is a National Stage of International Application No. PCT/JP2011/005335 filed Sep. 22, 2011, the contents of all of which are incorporated herein by reference in their entirety.

TECHNICAL FIELD

The present invention relates to a torsional vibration damping apparatus, and more particularly to a torsional vibration damping apparatus comprising a first rotation member, and a second rotation member between which a rotation torque can be transmitted while attenuating torsional vibrations caused therebetween.

BACKGROUND ART

Up until now, there has been proposed an automotive vehicle which comprises a driving source such as an internal combustion engine, an electric motor and the like, and vehicle wheels drivably connected with the driving source through a power transmission train to enable the driving force from the driving source to be transmitted to the vehicle wheels through the power transmission train. The power transmission train with which the driving source is drivably connected is apt to generate a muffled sound and a "jara sound" originated for example from the rotation fluctuation caused by the torque fluctuation of the internal combustion engine.

The term "jara sound" is intended to indicate an abnormal sound generated by the idling gear couples of the transmission gear couples collided by torsional vibrations originated from the rotation fluctuation caused by the torque fluctuation of the internal combustion engine. The term "muffled sound" is intended to indicate an abnormal sound generated in the passenger room by the vibrations caused by the torsional resonance of the power transmission train having the torque fluctuation of the internal combustion engine as a vibratory force.

There has so far been known a torsional vibration damping apparatus which is constructed to have a driving source such as an internal combustion engine, an electric motor and the like drivably connected with vehicle wheels to transmit the driving force from the driving source to the vehicle wheels through a power transmission train having transmission gear sets and to absorb torsional vibrations generated between the driving source and the power transmission train.

As a torsional vibration damping apparatus, there is, for example, an apparatus which comprises a hub member drivably connected with the input shaft of the transmission, a disc plate having a clutch disc to be selectively engaged with or disengaged from a flywheel at the side of the driving source, and resilient members resiliently connecting the hub member and the disc plate and equi-distantly provided in the circumferential direction of the hub member and the disc plate (e.g., see Patent Document 1).

CITATION LIST

Patent Literature

{PTL 1} Patent Publication No. JP2006-144861

SUMMARY OF INVENTION

Technical Problem

However, the conventional torsional vibration damping apparatus of this kind cannot increase the torsion angle of the hub member and the disc plate, and thus renders it difficult to lower the rigidity of the resilient member due to the construction in which the resilient members are equi-distantly provided in the circumferential direction of the hub member and the disc plate.

For this reason, the conventional torsional vibration damping apparatus encounters such a problem that the conventional torsional vibration damping apparatus cannot improve the attenuation property of the torsional vibration and cannot sufficiently attenuate the "jara" sound and the muffled sound if the conventional torsional vibration damping apparatus is positioned between the internal combustion engine and the power transmission train.

The present invention has been made to solve the previously mentioned problems, and has an object to provide a torsional vibration damping apparatus which can increase the torsion angle between the first rotation member and the second rotation member to lower the rigidity of the resilient member and to enhance the attenuation property of the torsional vibration.

Solution to Problem

To achieve the previously mentioned object, the torsional vibration damping apparatus according to the present invention comprises: a first rotation member, at least one or more sets of input gear pairs, each input gear rotatably supported on the first rotation member, a second rotation member provided to be relatively rotatable with the first rotation member and having an output gear held in mesh with each input gear pair, a resilient member having one end portion fastened to one gear of the input gear pair and the other end portion fastened to the other gear of the input gear pair, the one gear of the input gear pair having a first support portion radially spaced apart from the rotation center axis of the one gear to support one end portion of the resilient member, and the other gear of the input gear pair having a second support portion radially spaced apart from the rotation center axis of the other gear to support the other end portion of the resilient member.

In the torsional vibration damping apparatus according to the present invention, the first rotation member has the input gear pair connected with each other by the resilient member and held in mesh with the output gear, so that the input gear pair is revolved around the output gear while being rotated around its own axis by the rotation of the first rotation member when the rotation torque is transmitted to the first rotation member.

The resilient member has one end portion and the other end portion which are respectively fastened to the first support portion and the second support portion radially spaced apart from the axes of the one side input gear and the other side input gear, respectively, so that the resilient member can be resiliently deformed when the input gear pair is rotated.

The reaction force caused by the deformation of the resilient member acts to the effective radiuses of the input gear pair to cause the rotation torque to be generated in the direction to check the input gear pair from being rotated, and the rotation torque thus generated is transmitted to the first rotation member from the second rotation member.

When the first rotation member and the second rotation member are relatively rotated with each other, the resilient member is resiliently deformed, thereby making it possible to attenuate the torsional vibrations of the first rotation member and the second rotation member.

The input gear pair revolved around the output gear while being rotated around its own axis cause the resilient member to be resiliently deformed, so that the torsion angle between the first rotation member and the second rotation member can be expanded, thereby making it possible to wholly lower the rigidities of the first rotation member and the second rotation member, and thus to enhance the attenuation property of the torsional vibration.

Here, the effective radiuses of the input gear pair are intended to indicate radiuses on which the reaction force of the resilient member acts to the input gear pair. These radiuses are indicative of the straight line connecting the straight line between the first support portion and the second support portion with the rotation center axes of the one gear and the other gear of the input gear pair, in the state in which the first support portion and the second support portion are offset from the axis line connecting the rotation center axes of the one gear and the other gear of the input gear pair.

This straight line is perpendicular to the straight line connecting the first support portion and the second support portion, and has a predetermined angle with respect to the line connecting the rotation center axis of the one gear of the input gear pair and the first support portion and the line connecting the rotation center axis of the other gear of the input gear pair and the second support portion.

The torsional vibration damping apparatus according to the present invention may preferably be constructed to have the output gear held in mesh with the input gear pair at positions radially inwardly of the first rotation member, the gear ratio of the output gear and the input gear pair being set at 1.

The torsional vibration damping apparatus according to the present invention is constructed to have the gear ratio of the output gear and the input gear pair set at 1, so that within the range in which the input gear pair revolves around the output gear while each input gear rotating 180 degrees around its own axis, the rotation torque can be transmitted between the first rotation member and second rotation member.

This results in the fact that the torsion angle between the first rotation member and the second rotation member can be widened to 180 degrees, thereby making it possible to wholly decrease the torsion rigidities of the first rotation member and the second rotation member to an even lower level, and to enhance the attenuation property of the torsional vibration to an even higher level.

The torsional vibration damping apparatus according to the present invention may preferably be constructed to have the rotation center axes of the first support portion and the second support portion respectively positioned on the extension lines straightly extending from the axis line connecting the rotation center axes of the one gear and the other gear of the input gear pair when the first rotation member and the second rotation member are positioned at their neutral positions where the first rotation member and the second rotation member are not relatively rotated with each other, the resilient member being resiliently deformed in response to the first rotation member relatively rotated from its neutral position with respect to the second rotation member in the positive or negative side.

The torsional vibration damping apparatus according to the present invention is constructed to have the rotation center axes of the first support portion and the second support portion respectively positioned on the extension lines straightly extending from the axis line connecting the rotation center axes of the one gear and the other gear of the input gear pair when the first rotation member and the second rotation member are positioned at their neutral positions where the first rotation member and the second rotation member are not relatively rotated with each other, the resilient member is not resiliently deformed, so that the reaction force of the resilient member does not act to the effective radiuses of the input gear pair.

When, on the other hand, the first rotation member and the second rotation member are twisted with each other from their neutral positions, the first support portion and the second support portion are offset from the axis line connecting the rotation center axes of the one gear and the other gear of the input gear pair, so that the resilient member is resiliently deformed, and thus the reaction force of the resilient member acts to the effective radiuses of the input gear pair.

The reaction force caused by the deformation of the resilient member acts to the effective radiuses of the input gear pair to cause the rotation torque to be generated in the direction to check the input gear pair from being rotated, and the rotation torque thus generated is transmitted to the first rotation member from the second rotation member.

The torsional vibration damping apparatus according to the present invention is preferably constructed to have the first support portion and the second support portion rotatably supported on the input gear pair.

The torsional vibration damping apparatus according to the present invention is constructed to have the first support portion to support the one end portion of the resilient member and the second support portion to support the other end portion of the resilient member rotatably supported on the input gear pair, so that when each input gear of the input gear pair is rotated around its own axis to have the resilient member resiliently deformed, the first support portion and the second support portion are rotated in response to the resilient deformation of the resilient member. This makes it possible to prevent the resilient member from being bent in the center axis direction of the resilient member.

The torsional vibration damping apparatus according to the present invention may preferably be constructed to have the first rotation member partly constituted by a plate member to which the rotation torque from an internal combustion engine is transmitted, and the second rotation member partly constituted by a boss member connected with the input shaft of a power transmission train having transmission gear sets.

The torsional vibration damping apparatus according to the present invention can widen the range of the torsion angle between the first rotation member and the second rotation member to lower the rigidity of the resilient member. For this reason, the torsional vibration damping apparatus according to the present invention can attenuate the relatively large vibration originated from the rotation fluctuation caused by the torque fluctuation of the internal combustion engine and the torsional resonance of the power transmission train, and can suppress the "jara sound" generated by the idling gear couples of the transmission gear couples collided by the torsional vibration and the muffled sound generated by the torsional resonance of the power transmission train.

Advantageous Effects of Invention

The present invention can provide a torsional vibration damping apparatus which can increase the torsion angle between the first rotation member and the second rotation member to lower the rigidity of the resilient member, and can enhance the attenuation property of the torsional vibration.

DESCRIPTION OF EMBODIMENTS

The embodiment of the torsional vibration damping apparatus according to the present invention will be described hereinafter with reference to the accompanying drawings.

FIGS. 1 to 8 are views showing one embodiment of the torsional vibration damping apparatus according to the present invention.

Firstly, the construction of this embodiment will be explained hereinafter.

Figure 1:
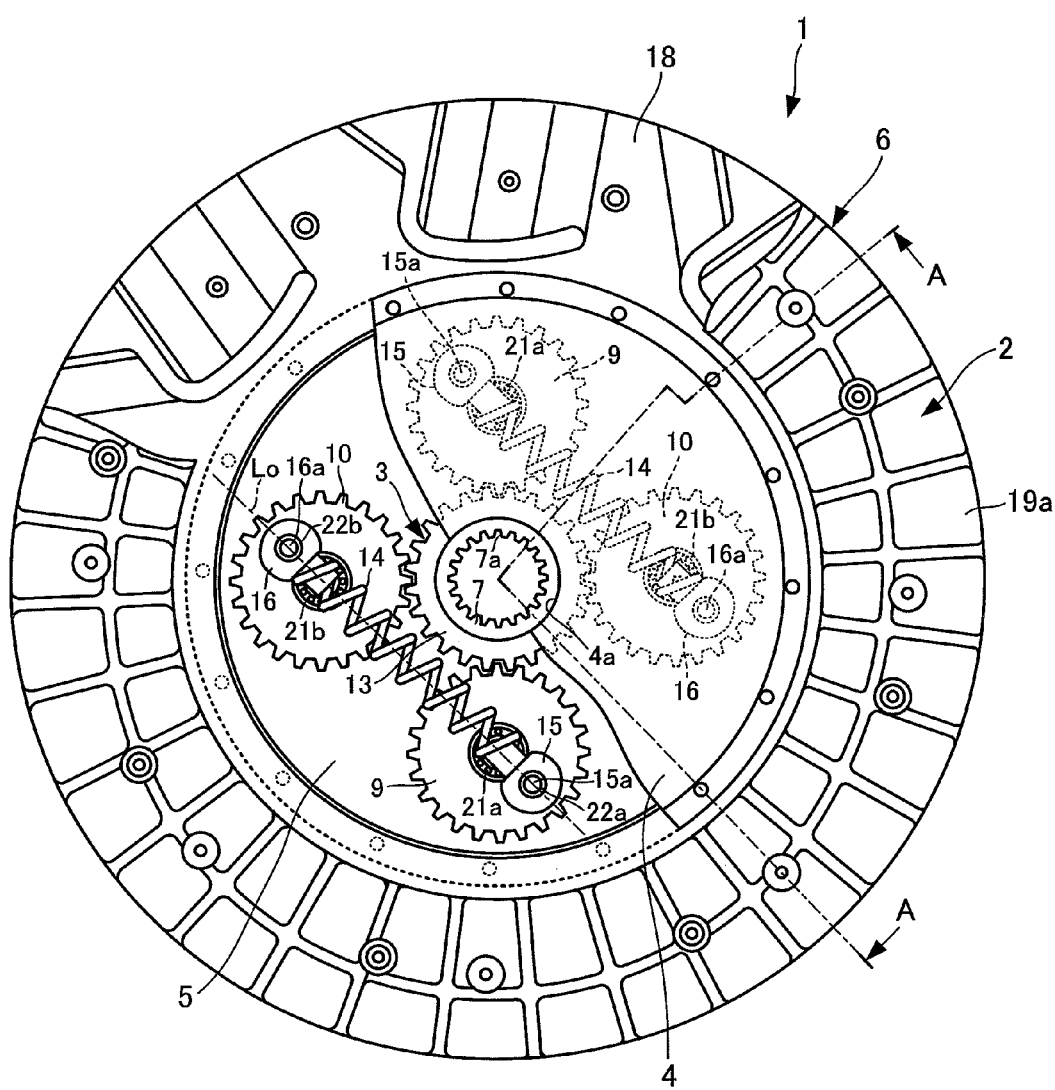
FIG. 1 shows one embodiment of a torsional vibration damping apparatus according to the present invention, and is a front view of the torsional vibration damping apparatus.
Figure 2:
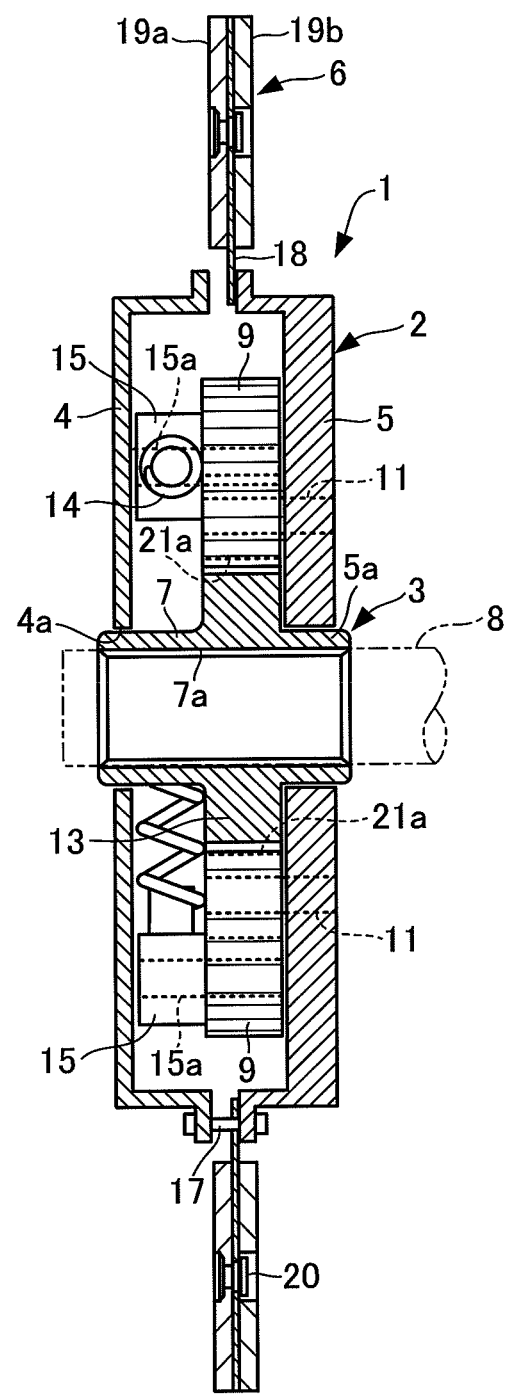
FIG. 2 shows one embodiment of the torsional vibration damping apparatus according to the present invention, and is a cross-sectional view taken along and seen from the chain line A-A in FIG. 1.

FIGS. 1 and 2 show a torsional vibration damping apparatus 1 which comprises a first rotation member 2, and a second rotation member 3 provided in coaxial relationship with the first rotation member 2 to be relatively rotatable with respect to the first rotation member 2.

The first rotation member 2 is designed to receive a rotation torque from an internal combustion engine serving as a driving source not shown and, while the second rotation member 3 is adapted to transmit the rotation torque of the first rotation member 2 to the transmission of the power transmission train also not shown.

The first rotation member 2 is provided with disc plates 4, 5 and a clutch disc 6. The disc plates 4, 5 and the clutch disc 6 collectively constitute a plate member.

The second rotation member 3 is provided with a boss member 7 having an inner peripheral portion formed with a spline 7a. The spline 7a is held in splined engagement with an input shaft 8 forming part of a transmission having transmission gear sets of the power transmission train, so that the boss member 7 is coupled with the input shaft 8 in such a manner that the boss member 7 is axially slidable with respect to the input shaft 8, and not relatively rotated with the input shaft 8, viz., rotated integrally with the input shaft 8.

The disc plates 4, 5 are spaced apart from each other in the axial direction of the boss member 7 in opposing relationship with each other and connected with each other by pins 17. This construction means that the disc plates 4, 5 are integrally rotatable with each other.

The radially inner portions of the disc plates 4, 5 are respectively formed with center bores 4a, 5a which are in opposing relationship with each other in the axial direction of the boss member 7. The input shaft 8 is received in the inner peripheral portion of the boss member 7 passing through the center bores 4a, 5a.

The disc plate 5 has input gears 9, 10 supported thereon, the input gears 9, 10 constituting an input gear pair. The disc plate 5 has gear pins 11, 12 secured thereto (see FIGS. 4, 5), the gear pins 11, 12 rotatably supporting the input gears 9, 10 through ball bearings 21a, 21b, respectively.

The input gears 9, 10 may be rotatably supported on the gear pins 11; 12 through slide bearings, respectively, in lieu of the ball bearings 21a, 21b which are one kind of roller bearings. The torsional vibration damping apparatus 1 according to the present embodiment is provided with two sets of input gear pairs each constituted by the input gears 9, 10.

On the outer peripheral portion of the boss member 7 is provided an output gear 13 which is held in mesh with the input gears 9, 10. Here, the output gear 13 may be integrally formed with the boss member 7, or may have an inner peripheral portion splined to the outer peripheral portion of the boss member 7. In the torsional vibration damping apparatus 1 according to the present embodiment, the boss member 7 and the output gear 13 constitute in combination the second rotation member 3.

The input gears 9, 10 of each set of input gear pairs are respectively provided with a crank member 15 serving as a first support portion, and a crank member 16 serving as a second support portion, the crank members 15, 16 respectively having crank pins 15a, 16a securely mounted thereon.

The crank pins 15a, 16a rotatably support the input gears 9, 10 through the thrust bearings 22a, 22b formed by slide bearings, respectively. These thrust bearings 22a, 22b may be replaced by ball bearings.

The crank member 15 is radially spaced apart from the gear pin 11 which forms the rotation center shaft of the input gear 9, while the crank member 16 is radially spaced apart from the gear pin 12 which also forms the rotation center shaft of the input gear 10.

The torsional vibration damping apparatus 1 comprises a coil spring 14 having one end portion engaged with the crank member 15 and the other end portion engaged with the crank member 16. The coil spring 14 constitutes a resilient member defined in the present invention.

Therefore, the one end portion of the coil spring 14 is fastened to the input gear 9 at a position radially spaced apart from the gear pin 11 of the input gear 9, while the other end portion of the coil spring 14 is fastened to the input gear 10 at a position radially spaced apart from the gear pin 12 of the input gear 10. The input gear 9 constitutes one gear of the input gear pair, while the input gear 10 constitutes the other gear of the input gear pair.

In the present embodiment, the crank member 15 constitutes a first support portion, while the crank member 16 constitutes a second support portion. The crank pins 15a, 16a respectively forming the rotation center shafts of the crank members 15, 16 are positioned on the line Lo (see FIG. 1) connecting the gear pins 11, 12 when the disc plates 4, 5 and the boss member 7 are positioned at their neutral positions where the disc plates 4, 5 and the boss member 7 are not twisted with respect to each other.

In the state as shown in FIG. 1 that the disc plates 4, 5 and the boss member 7 are positioned at their neutral positions, the crank pins 15a, 16a are positioned on the straight line Lo and take respective positions farthest away from each other to have the coil spring 14 expanded to the maximum expansion level. Under this condition, the coil spring 14 has the initial state.

When the input gears 9, 10 are rotated clockwise or anti-clockwise around the center axis of the boss member 7 from the above state, the crank member 15 is moved radially outwardly or radially inwardly of the boss member 7, while the crank member 16 is moved radially inwardly or radially outwardly of the boss member 7, viz., moved inversely to the movement of the crank member 15, so that the coil spring 14 is compressed and deformed.

The output gear 13 is positioned radially inwardly of the disc plates 4, 5 with respect to the input gears 9, 10 and held in mesh with the input gears 9, 10. The pitch circle diameters (PCD) and the gear numbers of the input gears 9, 10 and the output gear 13 are equal to each other. This means that the gear ratio of the input gears 9, 10 and the output shaft 13 is set at 1.

The clutch disc 6 is disposed radially outwardly of the disc plates 4, 5 and provided with a cushioning plate 18 and a pair of friction plates 19a, 19b. The cushioning plate 18 is made of a ring-shaped material corrugated in the thickness direction thereof, and firmly connected with the disc plates 4, 5 by pins 17.

The friction plates 19a, 19b are secured to the both surfaces of the cushioning plate 18 by rivets 20. The friction plates 19a, 19b are positioned between a flywheel not shown and a pressure plate of a clutch cover, the flywheel being drivably connected with a crankshaft of an internal combustion engine, while the pressure plate of the clutch cover being bolted to the flywheel.

The friction plates 19a, 19b pressurized by the pressure plate to be brought into frictional engagement with the flywheel and the pressure plate cause the rotation torque of the internal combustion engine to be inputted to the disc plates 4, 5.

The depression of a clutch pedal not shown causes the pressure plate to release the friction plates 19a, 19b from being pressurized by the pressure plate and to have the friction plates 19a, 19b spaced apart from the flywheel, so that the rotation torque of the internal combustion engine is not inputted to the disc plates 4, 5.

The operation will then be explained hereinafter.

Figure 3:
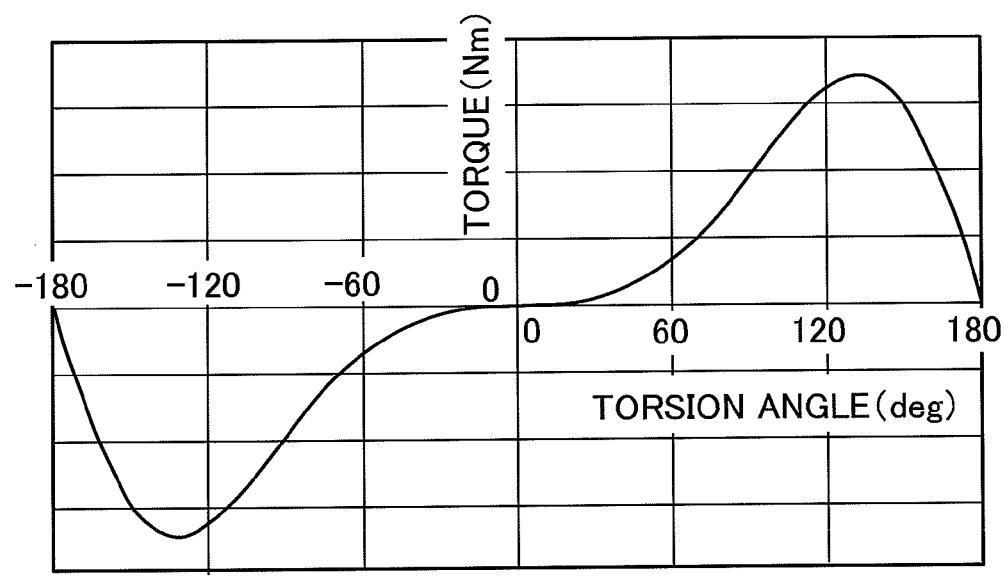
FIG. 3 shows one embodiment of the torsional vibration damping apparatus according to the present invention, and is a view showing the relationship between the torsion angle and the torque of the torsional vibration damping apparatus.

FIG. 3 shows a torsion property of the disc plates 4, 5 and the boss member 7, and is a graph showing the relationship between the torsion angle between the disc plates 4, 5 and the boss member 7 and the output torque to be outputted from the boss member 7 in the present embodiment.

The horizontal axis indicates the relative torsion angle of the boss member 7 with respect to the disc plates 4, 5, while the vertical axis indicates the output torque to be outputted from the boss member 7.

Firstly, the method to obtain the torsion property of the torsional vibration damping apparatus 1 according to the present embodiment will be explained hereinafter with reference to FIG. 4.

The pitch circle diameters (PCD) of the input gears 9, 10 and the output gear 13 are indicated by the symbol "d" for example. Here, the "d" is assumed as being 40 mm, the distances "S" between the crank pins 15a, 16a and the gear pins 11, 12 are assumed as being 10 mm, and the spring coefficient "k" of the coil spring 14 is assumed as being 300 N/mm.

The maximum distance "L" between the center axes of the crank pins 15a, 16a can be given by the following equation (1).

$$L = d \times \sqrt{2} + 2s \qquad (1)$$

The torsion angle between the disc plates 4, 5 and the boss member 7 is indicated by the symbol "a" (deg). The distance "La" between the center axes of the crank pins 15a, 16a when the disc plates 4, 5 and the boss member 7 is twisted with respect to each other at the torsion angle "a" can be given by the following equation (2), i.e., the Pythagorean theorem.

$$La = \sqrt{((2s \times \sin(a))^2 + (d \times \sqrt{2} + 2s \times \cos(a))^2)} \qquad (2)$$

The compression amount "dx" of the coil spring 14 can be given by the following equation (3).

$$dx = L - La \qquad (3)$$

The compression force "f" of the coil spring 14 can be given by the following equation (4).

$$f = k \times dx \qquad (4)$$

The base "Lp" of a right triangle with an oblique line formed between the crank pins 15a, 16a can be given by the following equation (5).

$$Lp = 2S \times \sin(a) \qquad (5)$$

The torque effective radius "r" of the compression force of the coil spring 14 acting to the input gears 9, 10 can be given from the ratio of the similar shapes of two right-angled triangles by the following equation (6).

$$r = Lp/La \times (d \times \sqrt{2}/2) \qquad (6)$$

Figure 4:
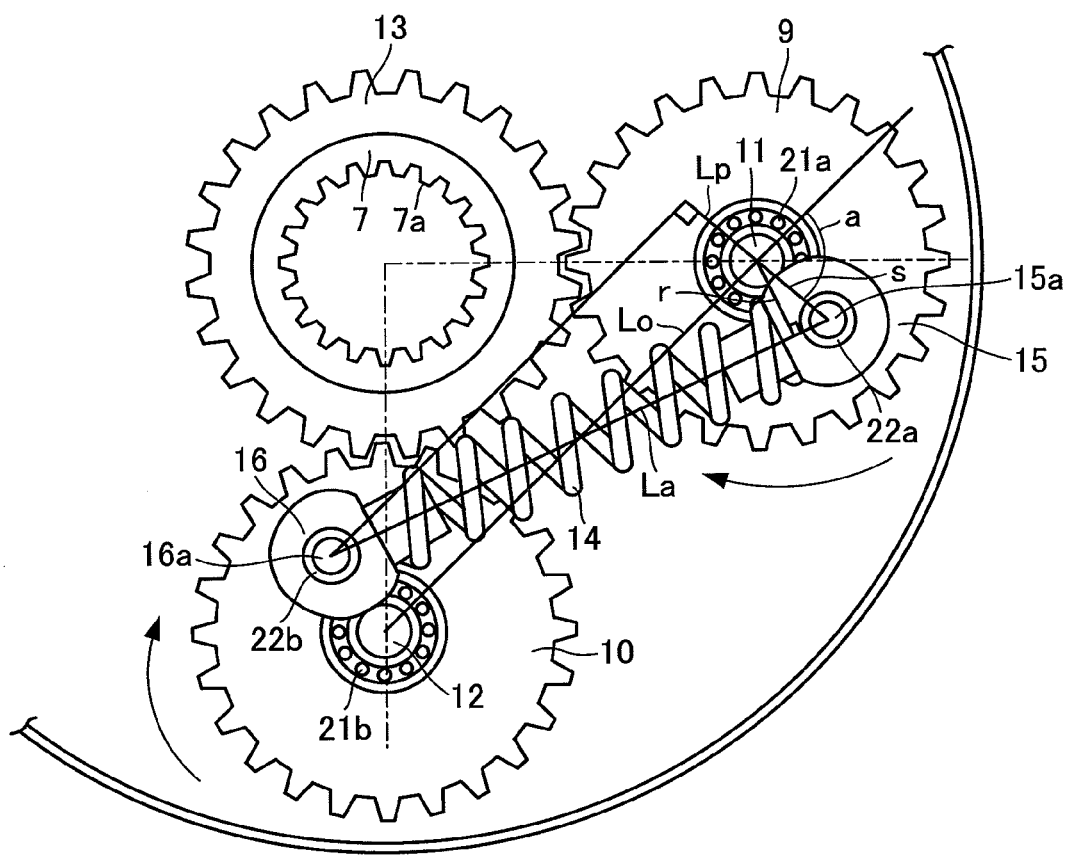
FIG. 4 shows one embodiment of the torsional vibration damping apparatus according to the present invention, and is a view showing the positional relationship between input gears and crank members for obtaining the torsional vibration property.

The torque effective radius "r" is clearly seen from FIG. 4 to indicate radius at which the reaction force of the coil spring 14 acts on the input gears 9, 10.

The above radius, i.e., the effective radius "r" is the straight line connecting "La" connecting the crank pins 15a, 16a and the gear pins 11, 12 of the input gears 9, 10. In the state that the crank pins 15a, 16a are offset from the axis line "Lo" connecting the gear pins 11, 12 of the input gears 9, 10. This straight line is perpendicular to the straight line "La" connecting the crank pins 15a, 16a, and has a predetermined angle "θ" with respect to the straight line "S" connecting the gear pins 11, 12 of the input gears 9, 10 and the crank pins 15a, 16a.

The effective radius "r" of the input gear 10 is not shown in FIG. 4, but is equal to that of the input gear 9.

The rotation torques "Tc" of the input gears 9, 10 can be given by the following equation (7).

$$Tc = r \times f/1000 \qquad (7)$$

From the equations (1) to (7), the rotation torque "T(N/m)" inputted to the output gear 13, i.e., the torsion property shown in FIG. 3 can be given by the following equation (8) since the input gears 9, 10 number four.

$$T = 4 \times Tc \qquad (8)$$

As indicated by the equation (7), the rotation torques "Tc" of the input gears 9, 10 are determined by the torque effective radius "r" of the compression force of the coil spring 14 acting on the input gears 9, 10 and the compression force of the coil spring 14.

FIGS. 5 to 8 show the states that the disc plates 4, 5 receive the rotation torque of the internal combustion engine and are rotated in the clockwise direction (R1) from the state shown in FIG. 1. For convenience sake, the following explanation will be directed to the case in which the boss member 7 is twisted with respect to the disc plates 4, 5 in the positive clockwise direction (R1 direction) and in the negative clockwise direction (R2 direction).

For better understanding, the disc plate 4 is shown in FIGS. 5 to 8 as being removed from the apparatus. The disc plate 4 is however moved integrally with the disc plate 5, so that only the disc plate 4 is used for the following explanation about FIGS. 5 to 8.

The disc plates 4, 5 are twisted in the positive side with respect to the boss member 7 at the acceleration time of the vehicle.

At the time of the clutch being engaged, the friction plates 19*a*, 19*b* are pressurized by the pressure plate to be brought into frictional engagement with the flywheel and the pressure plate, so that the rotation torque of the internal combustion engine is inputted to the disc plates 4, 5.

At the time of the clutch being disengaged, the friction plates 19*a*, 19*b* are released from being pressurized by the pressure plate to be brought out of frictional engagement with the flywheel and the pressure plate, so that the rotation torque of the internal combustion engine is not transmitted to the disc plates 4, 5.

The torsional vibration damping apparatus 1 according to the present embodiment is designed to have zero in the effective radius "r" of the compression force of the coil spring 14 acting on the input gears 9, 10 due to the fact that the crank pins 15*a*, 16*a* are positioned on the axis line "Lo" (see FIG. 4) connecting the gear pins 11, 12 in the state in which the relative rotations of the disc plates 4, 5 and the boss member 7 are at a small level as at the disengagement time of the clutch, viz., in which the disc plates 4, 5 and the boss member 7 take their neutral positions where the torsion angle between the disc plates 4, 5 and the boss member 7 is in the vicinity of zero degree.

In this state, the coil spring 14 is not compressed and deformed, thereby resulting in the reaction force of the coil spring 14 not acting on the crank members 15, 16. For this reason, there is no rotation torque generated on the input gears 9, 10, so that the rotation torques are not transmitted from the disc plates 4, 5 to the output gear 13 through the input gears 9, 10.

When, on the other hand, the rotation torque fluctuation caused by the torque fluctuation of the internal combustion engine is small in the engagement state of the clutch, the fluctuation torque between the disc plates 4, 5 and the boss member 7 is small, so that the disc plates 4, 5 are relatively rotated with respect to the boss member 7 in the positive clockwise direction (R1).

Figure 5:
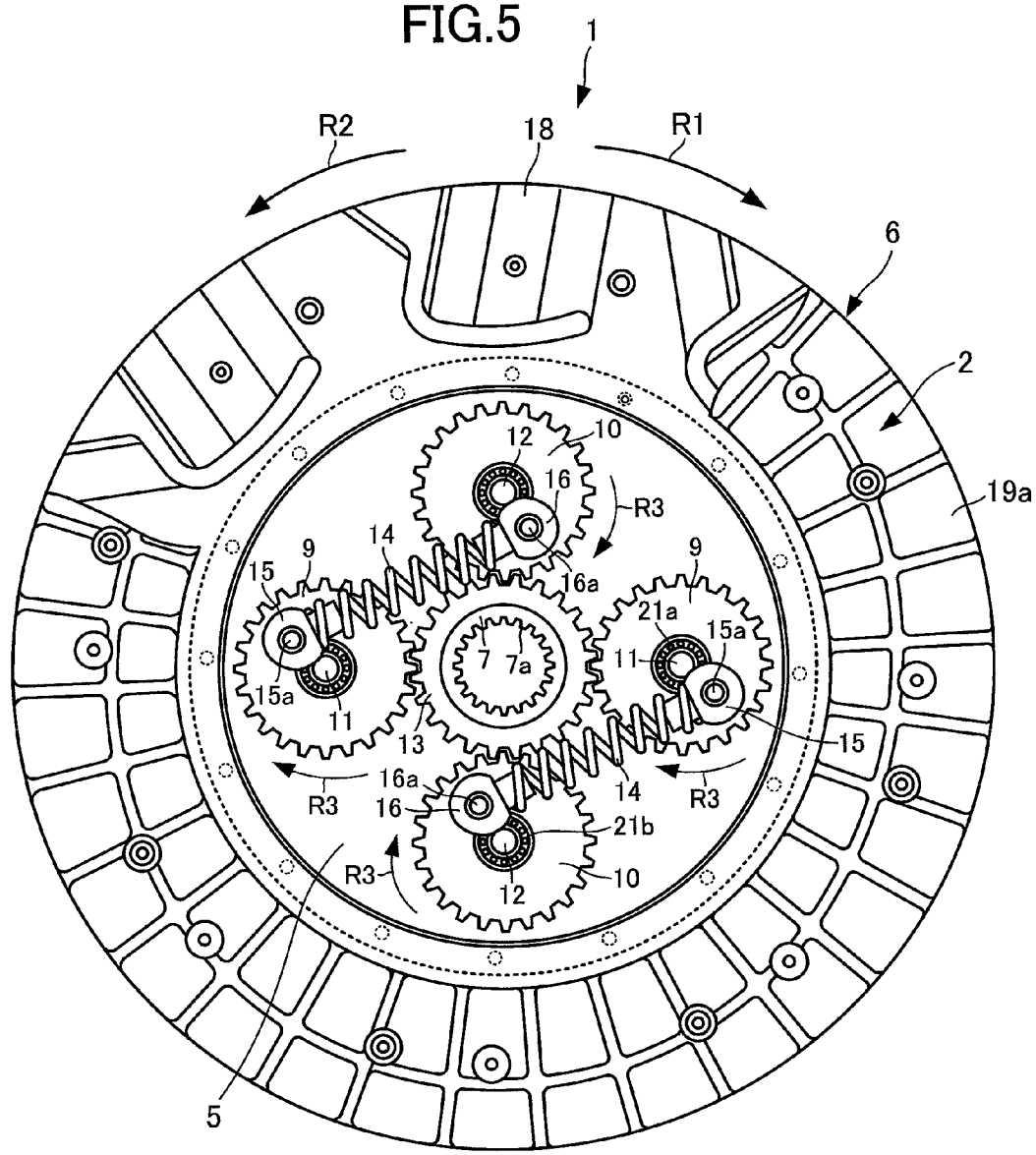
FIG. 5 shows one embodiment of the torsional vibration damping apparatus according to the present invention, and is a front view of the torsional vibration damping apparatus in which the disc plates are twisted with respect to the boss member in a positive side at +90 degrees.

At this time, as shown in FIG. 5, as the disc plates 4, 5 are twisted with respect to the boss member 7 in the R1 direction, the input gears 9, 10 held in mesh with the output gear 13 are revolved around the output gear 13 while being rotated around their own axes in the directions shown by arrows R3.

Due to the fact that the both end portions of the coil spring 14 are respectively fastened to the crank members 15, 16 radially spaced apart from the gear pins 11, 12 of the input gears 9, 10, the crank pins 15*a*, 16*a* are offset from the axis line "Lo" connecting the gear pins 11, 12 in response to the input gears 9, 10 being rotated in the directions shown by the arrows R3.

At this time, the distance between the crank pins 15*a*, 16*a* of the crank members 15, 16 is gradually decreased in response to the rotations of the input gears 9, 10, so that the coil spring 14 is compressed and deformed.

The reaction force caused by the compression and deformation of the coil spring 14 acts to the effective radius "r" of the input gears 9, 10, so that the rotation torque of the coil spring 14 is generated in the directions to check the input gears 9, 10 from being rotated. By way of the rotation torque thus generated, the rotation torque is transmitted from the disc plates 4, 5 to the boss member 7 through the input gears 9, 10 and the output gear 13.

When the torque fluctuation of the internal combustion engine causes the disc plates 4, 5 to be twisted with respect to the boss member 7 in the positive side, the coil spring 14 is resiliently deformed, so that the torsional vibration of the disc plates 4, 5 and the boss member 7 is attenuated while the driving force of the internal combustion engine is being transmitted from the disc plates 4, 5 to the power transmission train through the boss member 7.

When the rotation fluctuation caused by the torque fluctuation of the internal combustion engine is then further increased, the fluctuation torque between the disc plates 4, 5 and the boss member 7 is further increased, and thus disc plates 4, 5 are further relatively rotated with the boss member 7 in the positive clockwise direction (R1 direction).

Figure 6:
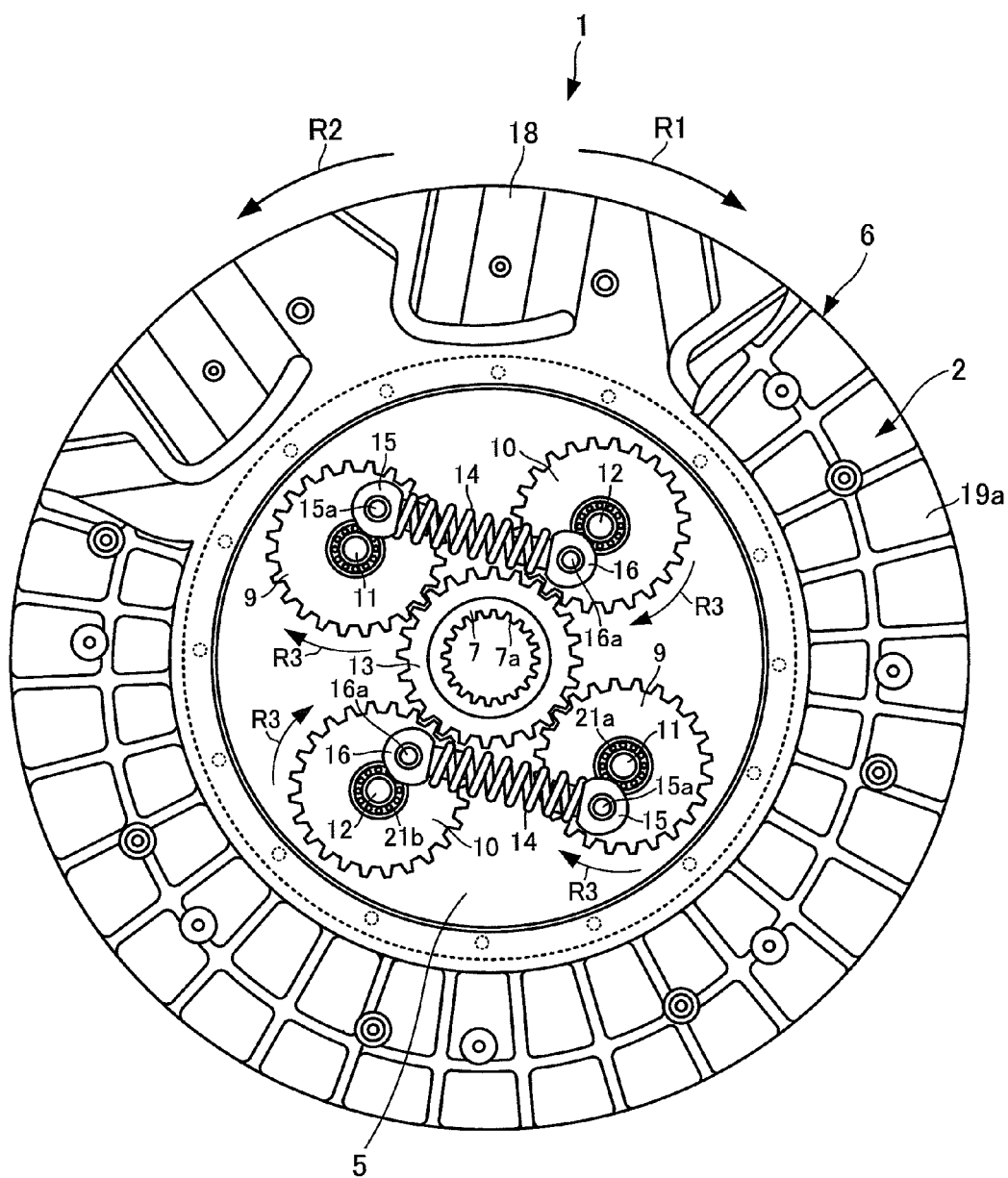
FIG. 6 shows one embodiment of the torsional vibration damping apparatus according to the present invention, and is a front view of the torsional vibration damping apparatus in which the disc plates are twisted with respect to the boss member in a positive side at +130 degrees.

At this time, as shown in FIG. 6, as the disc plates 4, 5 are twisted with respect to the boss member 7 in the R1 direction, the input gears 9, 10 held in mesh with the output gear 13 are revolved around the output gear 13 while being rotated around their own axes in the directions shown by arrows R3.

At this time, in response to the rotations of the input gears 9, 10, the distance between the crank pins 15*a*, 16*a* of the crank members 15, 16 are further decreased, and thus the coil spring 14 is further compressed and deformed.

The reaction force caused by the compression and deformation of the coil spring 14 can act to the effective radiuses of the input gears 9, 10 which in turn generate the rotation torques in the directions to check the input gears 9, 10 from being rotated. The rotation torques thus generated are transmitted from the disc plates 4, 5 to the boss member 7 through the input gears 9, 10 and the output gear 13.

When the torque fluctuation of the internal combustion engine causes the disc plates 4, 5 to be twisted with respect to the boss member 7 in the positive side, the coil spring 14 is resiliently deformed, so that the torsional vibration of the disc plates 4, 5 and the boss member 7 is attenuated while the driving force of the internal combustion engine is being transmitted from the disc plates 4, 5 to the power transmission train through the boss member 7.

When the rotation fluctuation caused by the torque fluctuation of the internal combustion engine is then even further increased, the fluctuation torque between the disc plates 4, 5 and the boss member 7 is even further increased, and thus disc plates 4, 5 are even further relatively rotated with the boss member 7 in the positive clockwise direction (R1 direction).

In the present embodiment, the gear ratio of the input gears 9, 10 and the output gear 13 are set at 1. When the disc plates 4, 5 and the boss member 7 take their neutral positions, the crank pins 15*a*, 16*a* of the crank members 15, 16 are positioned on the straight line "Lo" connecting the gear pins 11, 12.

For this reason, as the disc plates 4, 5 are twisted with respect to the boss member 7 in the R1 direction, the input gears 9, 10 held in mesh with the output gear 13 are revolved around the output gear 13 while being rotated around their own axes in the directions shown by arrows R3 until the rotation angle of the input gears 9, 10 comes to be 180 degrees from their neutral positions, whereupon the torsion angle between the disc plates 4, 5 and the boss member 7 becomes 180 degrees.

Figure 7:
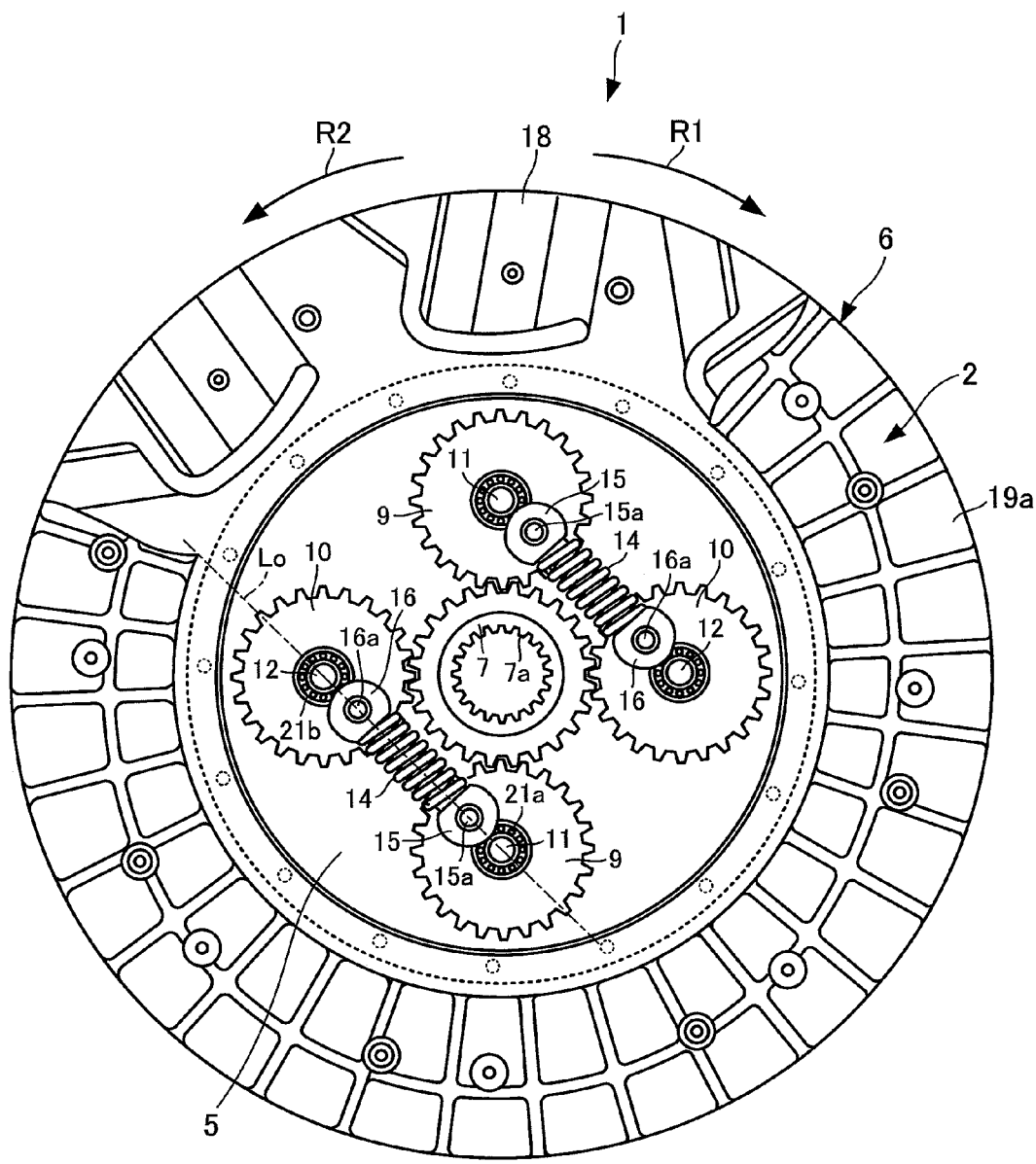
FIG. 7 shows one embodiment of the torsional vibration damping apparatus according to the present invention, and is a front view of the torsional vibration damping apparatus in which the disc plates are twisted with respect to the boss member in a positive side at +180 degrees.

At this time, as shown in FIG. 7, the crank pins 15*a*, 16*a* are positioned on the axis line "Lo" connecting the gear pins 11, 12 and inwardly of the axis line "Lo". Under this state, the effective radius "r" of the compression force of the coil spring 14 acting on the input gears 9, 10 comes to be 0 (zero), so that the rotation torque of the coil spring 14 is not generated to the input gears 9, 10. When, in this state, the disc plates 4, 5 are inputted excessively large torques from the internal combustion engine, the input gears 9, 10 are rotated to have the distance between the crank members 15, 16 gradually increased, so that the crank members 15, 16 are resiliently urged by the coil spring 14, and thus the input gears 9, 10 are rotated.

The rotations of the input gears 9, 10 cause the coil spring 14 to be further expanded, thereby making it possible to prevent the reaction force of the coil spring 14 acting on the crank pins 15, 16 from becoming excessively large, and to prevent the rotations of the input gears 9, 10 from being locked. This means that the input gears 9, 10 can function as torque limiters at the acceleration time of the vehicle.

As a consequence, the excessively large torque can be prevented from being transmitted to the boss member 7 from the disc plates 4, 5, and therefore can protect the transmission gear couples in the power transmission train at the acceleration time of the vehicle.

In response to the increased torsion angle between the disc plates 4, 5 and the boss member 7, the reaction force generated by the compression force of the coil spring 14 is increased. In spite of the reaction force thus increased, the reason why the rotation torque to be inputted to the boss member 7 from the disc plates 4, 5 is reduced after the torsion angle exceeds the vicinity of 120 degrees as shown in FIG. 3 is due to the fact that the effective radius "r" of the compression force of the coil spring 14 acting on the input gears 9, 10 becomes lessened.

From the foregoing description, it will be understood that the rotation torques of the input gears 9, 10 are determined by the effective radius "r" of the compression force of the coil spring 14 acting on the input gears 9, 10 and the compression force of the coil spring 14, while the rotation torques to be transmitted to the boss member 7 from the disc plates 4, 5 are determined by the rotation torques of the input gears 9, 10.

On the other hand, at the deceleration time of the vehicle, the drive torque of the internal combustion engine becomes small while causing an engine brake, so that the rotation torque is inputted to the boss member 7 from the input shaft 8 of the power transmission train. When there is caused a rotation fluctuation resulting from the torque fluctuation of the internal combustion engine at the deceleration time of the vehicle, the disc plates 4, 5 are twisted with respect to the boss member 7 in the negative side (R2 direction).

Figure 8:
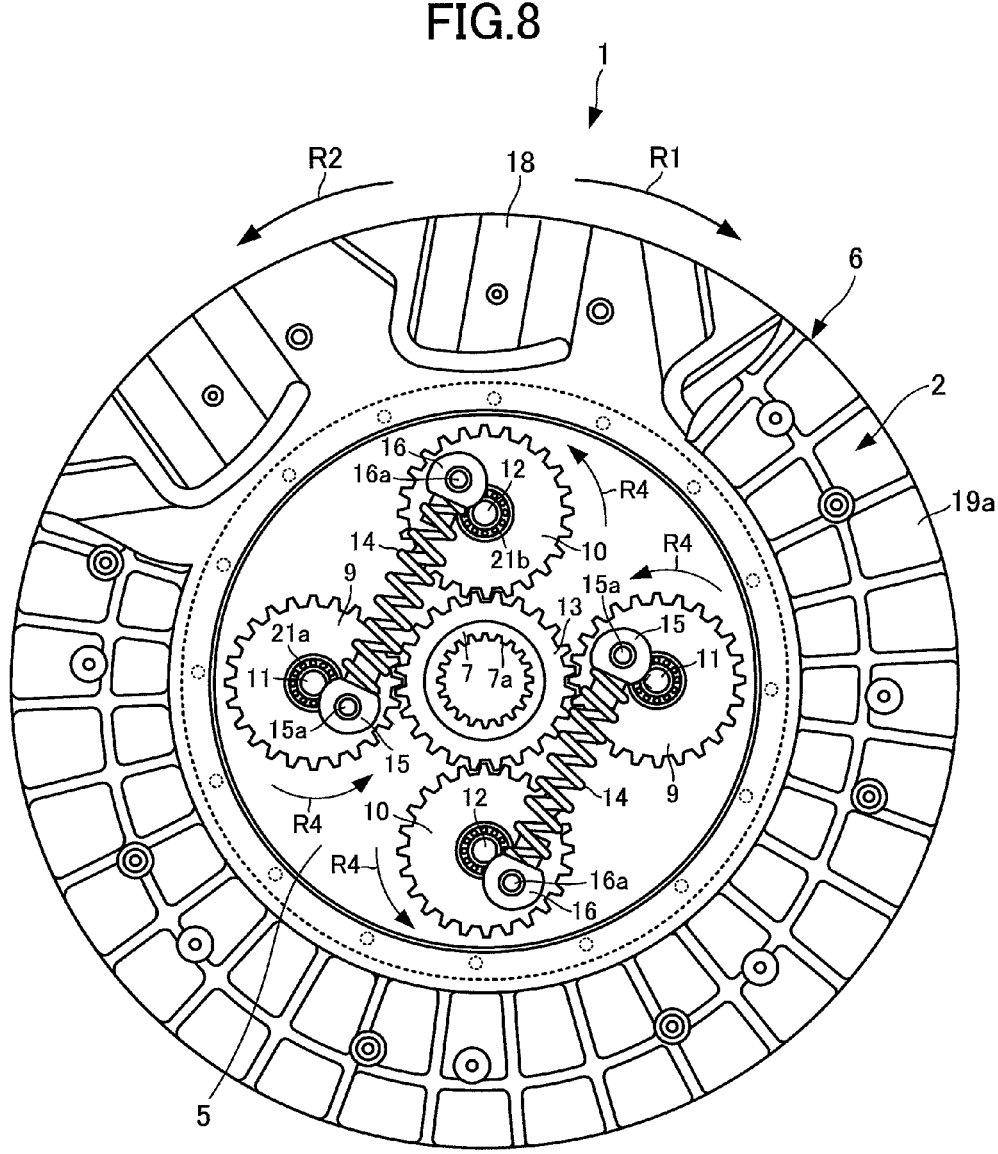
FIG. 8 shows one embodiment of the torsional vibration damping apparatus according to the present invention, and is a front view of the torsional vibration damping apparatus in which the disc plates are twisted with respect to the boss member in a negative side at −90 degrees.

At this time, as shown in FIG. 8, in response to the disc plates 4, 5 twisted with respect to the boss member 7 in the R2 direction, the input gears 9, 10 held in mesh with the output gear 13 are revolved around the output gear 13 while rotating around their own axes in the direction shown by arrows R4.

The fact that the both end portions of the coil spring 14 are respectively fastened to the crank members 15, 16 radially spaced apart from the gear pins 11, 12 of the input gears 9, 10 leads to the fact that in response to the rotations of the input gears 9, 10 in the directions shown by the arrows R4, the crank pins 15a, 16a are offset from the axis line "Lo" connecting the gear pins 11, 12.

At this time, in response to the rotations of the input gears 9, 10, the distance between the crank members 15, 16 are gradually reduced, thereby compressing and deforming the coil spring 14.

The reaction force caused by the compressed and deformed coil spring 14 acts on the crank members 15, 16, thereby generating the rotation torques in the directions to check the input gears 9, 10 from being rotated. The rotation torques thus generated are transmitted to the boss member 7 through the input gears 9, 10 and the output gear 13 from the disc plates 4, 5.

When, on the other hand, the torque fluctuation of the internal combustion engine causes the disc plates 4, 5 to be twisted with respect to the boss member 7 in the negative sides, the coil spring 14 is resiliently deformed, so that the torsional vibration of the disc plates 4, 5 and the boss member 7 is attenuated while transmitting the driving force of the internal combustion engine to the power transmission train through the boss member 7 from the disc plates 4, 5.

The previously mentioned torsional vibration damping apparatus 1 according to the present embodiment is constructed to have a pair of disc plates 4, 5 to be transmitted a rotation torque from the internal combustion engine, input gears 9, 10 rotatably supported on the disc plates 4, 5, an output gear 13 provided to be relatively rotatable with respect to the disc plates 4, 5 and held in mesh with the input gears 9, 10, a boss member 7 splined to the input shaft 8 of the power transmission train, and a coil spring 14 having one end portion fastened to the input gear 9 and the other end portion fastened to the input gear 10.

The torsional vibration damping apparatus 1 is constructed in such a manner that the input gear 9 has a crank member 15 radially spaced apart from the gear pin 11 of the input gear 9 to support the one end portion of the coil spring 14, while the input gear 10 has a crank member 16 radially spaced apart from the gear pin 12 of the input gear 10 to support the other end portion of the coil spring 14.

For this reason, the input gears 9, 10 rotating around their own axes while revolving around the output gear 13 causes the coil spring 14 to be resiliently deformed, thereby making it possible to increase the torsion angle between the disc plates 4, 5 and the boss member 7. This means that the torsion rigidities of the disc plates 4, 5 and the boss member 7 can wholly be lowered, thereby leading to improving the attenuation property of the torsional vibration.

In particular, the previously mentioned torsional vibration damping apparatus 1 according to the present embodiment is designed in such a manner that the input gears 9, 10 are held in mesh with the output gear 13 at the positions radially inward of the disc plates 4, 5, and the gear ratio of the output gear 13 and input gears 9, 10 is set at 1.

For this reason, within the range in which the input gears 9, 10 revolve around the output gear 13 while rotating 180 degrees around their own axes, the rotation torque can be transmitted between the disc plates 4, 5 and the boss member 7.

This results in the fact that the torsion angle between the disc plates 4, 5 and the boss member 7 can be widened to 180 degrees, thereby making it possible to wholly decrease the torsion rigidities of the disc plates 4, 5 and the boss member 7 to an even lower level, and to enhance the attenuation property of the torsional vibration to an even higher level.

The torsional vibration damping apparatus 1 according to the present embodiment thus constructed can attenuate the relatively large vibration originated from the rotation fluctuation caused by the torque fluctuation of the internal combustion engine and the torsional resonance of the power transmission train, and can suppress the "jara sound" generated by the idling gear couples of the transmission gear couples collided by the torsional vibration and the muffled sound generated by the torsional resonance of the power transmission train.

The torsional vibration damping apparatus 1 according to the present embodiment is constructed to have the disc plates 4, 5 and the boss member 7 take their neutral positions where the crank pins 15a, 16a of the crank members 15, 16 are respectively positioned on the extension lines straightly extending from the axis line "Lo" connecting the gear pins 11, 12 of the input gears 9, 10, so that the coil spring 14 can be resiliently deformed in response to the disc plates 4, 5 moving relatively with respect to the boss member 7 in the positive side or in the negative side from their neutral positions.

When the disc plates 4, 5 and the boss member 7 are positioned at their neutral positions, the crank pins 15a, 16a are respectively positioned on the extension lines straightly extending from the straight line Lo connecting the gear pins 11, 12 of the input gears 9, 10, the coil spring 14 is not resiliently deformed, so that the reaction force of the coil spring 14 does not act to the effective radiuses of the input gears 9, 10.

When the disc plates 4, 5 and the boss member 7 are twisted with respect to each other from their neutral positions, the crank pins 15a, 16a of the crank members 15, 16 are offset from the straight line Lo connecting the gear pins 11, 12 of the input gears 9, 10, the coil spring 14 is resiliently deformed, so that the reaction force of the coil spring 14 can act to the effective radiuses of the input gears 9, 10.

For this reason, the rotation torque is generated in the direction to check the input gears 9, 10 from being rotated, so that the rotation torque from the disc plates 4, 5 can be transmitted to the boss member 7 while the input gears 9, 10 being checked from being rotated.

The torsional vibration damping apparatus 1 according to the present embodiment is constructed to have the crank members 15, 16 which respectively support the both end portions of the coil spring 14, the crank members 15, 16 being rotatably mounted on the input gears 9, 10, respectively.

For this reason, when the input gears 9, 10 are rotated around their own axes to resiliently deform the coil spring 14, the crank members 15, 16 can be rotated in response to the resilient deformation of the coil spring 14. This makes it possible to prevent the coil spring 14 from being bent in the center axis direction of the coil spring 14.

Although the torsional vibration damping apparatuses 1 of the above embodiments have been explained as each intervening between the internal combustion engine of the vehicle and the power transmission train having the transmission, the present invention is not limited to those embodiments, but can be applied to any type of torsional vibration damping apparatuses to be provided in the power transmission train forming part of the vehicle and the like.

The torsional vibration damping apparatus 1 may be applied to a hybrid damper forming part of a hybrid vehicle which is disposed between the output shaft of the internal combustion engine and the power splitting mechanism for splitting the drive forces to the electric motor and the output shaft to the vehicle wheels.

Further, the torsional vibration damping apparatus 1 may be applied to the lockup damper positioned between the lockup clutch apparatus of the torque converter and the transmission gear couple.

Further, the torsional vibration damping apparatus 1 may be provided between the differential case and the ring gear mounted on the outer peripheral portion of the differential case.

From the foregoing description, it will be understood that the torsional vibration damping apparatus according to the present invention has such an advantageous effect that the torsion angle between the first rotation member and the second rotation member can be increased to lower the rigidity of the resilient member and to enhance the attenuation property of the torsional vibration. The torsional vibration damping apparatus according to the present invention is useful as a torsional vibration damping apparatus which can transmit the rotation torque while attenuating the torsional vibration between the first rotation member and the second rotation member.

Reference Signs List

1: torsional vibration damping apparatus
2: first rotation member
3: second rotation member
4, 5: disc plates (first rotation member, plate member)
6: clutch disc (first rotation member, plate member)
7: boss member (second rotation member)
8: input shaft
9, 10: input gears (input gear pair)
11, 12: gear pins (rotation center shaft of the input gear pair)
12: gear pin
13: output gear (second rotation member)
14: coil spring (resilient member)
15: crank member (first support portion)
16: crank member (second support portion)
15a: crank pin (rotation center shaft of first support portion)
16a: crank pin (rotation center shaft of second support portion)

The invention claimed is:

1. A torsional vibration damping apparatus, comprising:
a plate member having a clutch disc to which rotation torque from an internal combustion engine is transmitted,
at least two or more sets of input gear pairs, each input gear rotatably supported on the plate member and revolvable with a rotation of the plate member,
a boss member provided to be relatively rotatable with respect to the plate member and having an output gear held in mesh with each input gear pair, the boss member being connected with the input shaft of a power transmission train having transmission gear sets, and
a resilient member having one end portion fastened to one gear of the input gear pair and the other end portion fastened to the other gear of the input gear pair,
the one gear of the input gear pair having a first support portion radially spaced apart from the rotation center axis of the one gear to support one end portion of the resilient member, and the other gear of the input gear pair having a second support portion radially spaced apart from the rotation center axis of the other gear to support the other end portion of the resilient member, wherein
the rotation center axes of the first support portion and the second support portion of each set of the input gear pairs are respectively positioned on the extension lines straightly extending from the axis line connecting the rotation center axes of the one gear and the other gear of each set of the input gear pairs when the plate member and the boss member are positioned at their neutral positions where the plate member and the boss member are not relatively rotated with each other, the resilient member being positioned on the axis line and resiliently deformed in response to the plate member relatively rotated from its neutral position with respect to the boss member in the positive or negative side.

2. The torsional vibration damping apparatus as set forth in claim 1, in which the output gear is held in mesh with the input gear pair at positions radially inwardly of the plate member, the gear ratio of the output gear and the input gear pair being set at 1.

3. The torsional vibration damping apparatus as set forth in claim 1, in which the first support portion and the second support portion are rotatably supported on the input gear pair.

* * * * *